(No Model.)
B. S. CHURCH.
APPARATUS FOR SEPARATING PRECIOUS METALS FROM SAND, ROCK, &c.
No. 594,522. Patented Nov. 30, 1897.
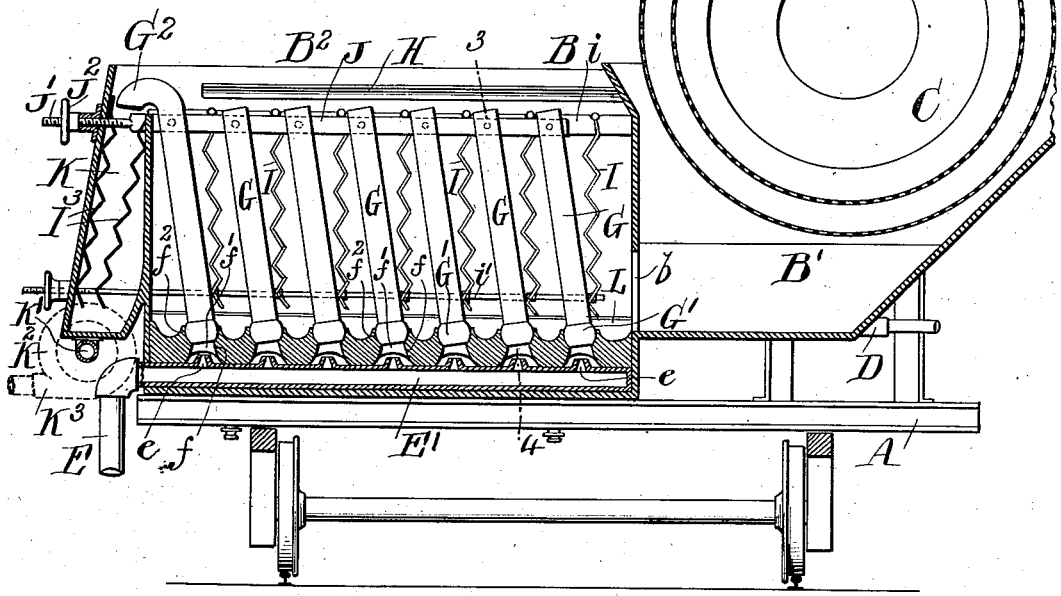
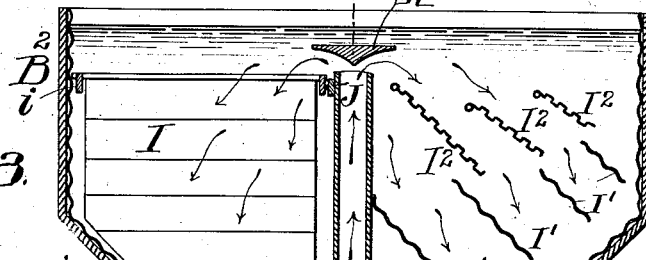
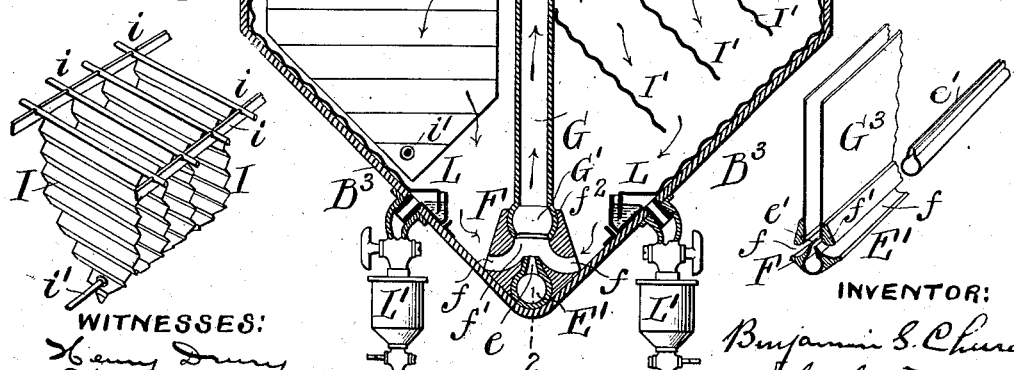
WITNESSES:
INVENTOR:
Benjamin S. Church
by his atty

UNITED STATES PATENT OFFICE.

BENJAMIN S. CHURCH, OF NEW YORK, N. Y., ASSIGNOR, BY MESNE ASSIGN-
MENTS, TO THE CHURCH MACHINERY COMPANY, OF NEW JERSEY.

APPARATUS FOR SEPARATING PRECIOUS METALS FROM SAND, ROCK, &c.

SPECIFICATION forming part of Letters Patent No. 594,522, dated November 30, 1897.

Application filed December 4, 1893. Renewed May 7, 1897. Serial No. 635,602. (No model.)

*To all whom it may concern:*

Be it known that I, BENJAMIN S. CHURCH, a citizen of the United States, residing in the city, county, and State of New York, have invented a new and useful Improvement in Apparatus for Separating Precious Metals from Sand, Crushed Rock, &c., of which the following is a true and exact description, reference being had to the accompanying drawings, which form a part thereof.

My invention relates to apparatus adapted for separating and saving precious metals found in admixture with earth, sand, rock, &c., my object being to provide improved apparatus for handling auriferous sand, slime, &c., and my improved device being particularly, though not exclusively, adapted for use in that class of separating-machines known as "amalgamators."

In another application filed by me on the 22d day of November, 1893, and bearing the serial number 491,608 I have described and claimed a new device for separating and saving precious metals by the repeated passage of the auriferous sand or slime through a tank provided with separating appliances and in the same downward direction, the material being elevated after each passage through the tank in such a way as not to disturb the settling action of the sand over the separating devices, this treatment being preferably carried on in such a way and in such tanks that the downward motion of the auriferous sand takes place in a large and comparatively quiescent body of water, the sand being preferably carried up with water from the bottom of the tank through conduits of small area, so that the sand and water will not separate during the upward motion and the sand or sand and water being given a longitudinal forward motion in the tank, so that each body of sand travels gradually from one end to the other in what may be called a "spiral" course. In my said former application I have described several mechanical modifications embodying my invention, among which is the appliance which forms the subject-matter of my present application, which, however, is not specifically claimed in my former application because it is alternative to another form specifically claimed therein.

My present invention relates specifically to separating or amalgamating tanks in which a jet or jets of steam or water or other fluid are used in a particular way to communicate the necessary circulation to the auriferous sand under treatment.

Reference being now had to the drawings which illustrate my invention, Figure 1 is a longitudinal section through an apparatus embodying my invention, taken as on a section-line 1 2 of Fig. 2. Fig. 2 is a cross-section through the separating-tank, taken on the line 3 4 of Fig. 1. Fig. 3 is a perspective view illustrating a construction of amalgamating-plates adapted for use in the apparatus, and Fig. 4 a perspective view illustrating a modified construction of the jet-pump.

A indicates a vehicle or car body upon which it is preferable to support the entire apparatus, so that it can be moved readily from place to place—as, for instance, along the face of a placer-mine.

B indicates a tank supported on the car-body and, as shown, divided into two compartments $B'$ and $B^2$.

C indicates a rotary screen, which may be of any familiar construction, into which the material from the placer is thrown and through the sieve or sieves forming the outer jacket, by which the fine material finds its way into the tank $B'$. The sieve is shown revolving in said tank and as being partly submerged therein.

D indicates a water-supply pipe, of which there may be any desired number, entering the tank-compartment $B'$.

$b$ indicates an opening between the tank-compartments $B'$ and $B^2$. The tank-compartment $B^2$ is the separator-tank proper. It is preferably formed with inclined sides $B^3 B^3$, so as to give it a hopper-shaped bottom.

E is a supply-pipe, through which water or air or steam under pressure is delivered to the pipe $E'$, which, as shown, extends along the bottom of the tank $B^2$ and through an opening or openings in which the water escapes upward.

$e\ e$, &c., indicate a series of nozzles leading from the pipe $E'$, and $e'$, Fig. 4, indicating a continuous narrow slot in place of such series of nozzles.

F indicates a casting or block, which, together with the jet-pipe E' and its nozzles or slot, forms a jet pump or pumps, $f'$ indicating an opening in line with the jets from pipe E', and $ff$ lateral openings communicating with the bottom of the tank, as shown.

G G, &c., Figs. 1 and 2, indicate a series of pipes secured to the end of or forming extensions of the mouthpiece of the jet-pump and leading to points at or near the top of the tank, where they open into it. As indicated, these pipes G are made angularly adjustable, preferably by forming a ball-and-socket joint at the bottom thereof, ball G' fitting into a socket $f^2$ in the block F. It is obvious, of course, that any change in the angular adjustment of the pipes G will vary the direction or rate of feed with which the auriferous sand is moved through the tank. In the drawings I have indicated the whole series of pipes G G, &c., as being connected together by means of a shifting rod J, which has at its end a screw-rod J', extending from the outside of the tank, and an adjustable screw $J^2$.

H indicates a deflector situated above the mouths of the pipes G.

I I, &c., indicate a series of transversely-set corrugated amalgamating-plates, which are supported at their top edges, as indicated at $i$, and made angularly adjustable by means of adjustable rod $i'$. By the use of these plates, which, however, as they are described in my former application are not specifically claimed in the present case, the longitudinal motion of the sand through the separating or amalgamating tank can be regulated at will, such plates, for instance, being used either with or instead of the angularly-adjustable pipes G. At I' I', &c., I have indicated another way of setting the amalgamating-plates in the tank, and at $I^2 I^2$, &c., I have indicated a series of riffle-plates which may be used with the amalgamating-plates or in some cases in place of them.

$G^3$, Fig. 4, indicates an elongated conduit forming an extension of the jet-pump illustrated in Fig. 4, the conduit $G^3$ being substituted in this case for the pipes G.

Where a series of pipes G are used, as indicated in Figs. 1 and 2, I prefer to use one member of the series, as $G^2$, Fig. 1, as a means for delivering the sand to the outside of the separating-tank. This can be conveniently done, as indicated, by curving the top of the pipe $G^2$, so that its mouth will lie outside of the tank, and, as shown, this delivery mouth or nozzle opens into a tailings-tank K, in which, if desired, may be placed amalgamating-plates, as $I^3$, and at the bottom of which, by means of a conduit K', is connected a tailings-pump $K^2$, which forces the tailings through a pipe $K^3$ to a convenient point for dumping them.

L L indicate mercury-traps arranged to receive mercury or amalgam dropping from the amalgamating-plates in the tank and connecting with amalgam-bottles L' L', from which the material can be drawn from time to time, the mercury separated from the amalgam, and reused.

It will be obvious that by using jet-pumps, as described, at the bottom of the tank the sand settling to the bottom thereof will be energetically acted upon and drawn into the pump. It will also be evident that as the sand and water drawn from the tank are actually incorporated into the jet and go through the pump they will be given an exceedingly energetic and direct motion upward. In both of these respects my appliances will be recognized as having advantageous features over known appliances in which the sand and water from the tank are not actually incorporated into the jet before issuing into the tank again. By providing the jet pump or pumps with a conduit leading to the top of the tank I entirely obviate the tendency of the jet to spread itself out and to communicate irregular motions to the body of water in the tank and insure that the sand will have an even descending motion over the separating appliances.

The further advantages of my apparatus in providing for an even and regulatable forward feeding of the sand under treatment have been sufficiently indicated above.

Having now described my invention, what I claim as new, and desire to secure by Letters Patent, is,—

1. In an apparatus for separating precious metals from sand the combination of a tank, one or more separators situated therein and adapted to catch and retain the precious metals, a return-conduit or a series of return-conduits of relatively small cross-sectional area as compared with the tank extending from front to rear of the tank and opening into the top of said tank in a line extending from front to rear, and a jet-pump or series of jet-pumps situated along the bottom of the tank from front to rear said jet pump or pumps having suction-openings as $ff$ leading from the bottom of the tank from front to rear thereof, and said pump or pumps delivering sand and water into the return conduit or conduits aforesaid, all substantially as specified and so as to effect a uniform articulation of the sand in the tank.

2. In an apparatus for separating precious metals from sand the combination of a tank, one or more separators situated therein and adapted to catch and retain the precious metals, a return-conduit or a series of return-conduits of relatively small cross-sectional area as compared with the tank extending from front to rear of the tank and opening into the top of said tank in a line extending from front to rear, a jet-pump or series of jet-pumps situated along the bottom of the tank from front to rear said jet pump or pumps having suction-openings as $ff$ leading from the bottom of the tank from front to rear thereof, and said pump or pumps delivering sand and water with the return conduit or conduits aforesaid, and means as described for feeding the sand longitudinally forward in the tank as it circulates therein.

3. In an apparatus for separating precious metals from sand the combination of a tank, one or more separators situated therein, a series of pipes constituting return-conduits arranged in line from front to rear of the tank and opening into the top thereof, a series of jet-pumps also extending from front to rear of the tank having suction-openings as $ff$ leading from the bottom of the tank said pumps delivering sand and water into the return-conduits aforesaid all substantially as and for the purpose specified.

4. In an apparatus for separating precious metals from sand the combination of a tank, a separator system situated in said tank, and adapted to catch and retain the precious metals, a series of jet-pumps situated in the bottom of the tank and adapted to carry up the sand settling to the bottom of the tank, a series of angularly-adjustable pipes arranged to receive the sand and water thrown up by the jet-pumps and convey it to the top of the tank.

5. In an apparatus for separating precious metals from sand the combination of a tank, a separator system situated in said tank and adapted to catch and retain the precious metals, a series of jet-pumps situated in the bottom of the tank and adapted to carry up the sand settling to the bottom of the tank and a series of angularly-adjustable pipes secured to the mouths of the jet-pumps by ball-and-socket joints arranged to receive the sand and water thrown up by the jet-pumps and convey it to the top of the tank.

6. In an apparatus for separating precious metals from sand, the combination of a tank, a separator system situated in said tank and adapted to catch and retain the precious metals, a series of jet-pumps situated in the bottom of the tank and adapted to carry up the sand settling to the bottom of the tank, and a series of angularly-adjustable pipes, secured to the mouths of the jet-pumps by ball-and-socket joints arranged to receive the sand and water thrown up by the jet-pumps and carry it to the top of the tank, and means for adjusting the angular inclination of said pipes.

7. In an apparatus for separating precious metals from sand, the combination of a tank, a separator system situated in said tank and adapted to catch and retain the precious metals, a series of jet-pumps situated in the bottom of the tank and a series of pipes arranged to receive the sand and water thrown up by the jet-pumps and carry it to the top of the tank, and a terminal pipe as $G^2$ leading to the outside of the tank.

BENJAMIN S. CHURCH.

Witnesses:
O. H. SANDERSON,
JNO. P. GILLIS.